(12) United States Patent
Bassier et al.

(10) Patent No.: US 9,542,029 B2
(45) Date of Patent: Jan. 10, 2017

(54) VEHICLE MULTI-MODE VERTICAL-SPLIT-SCREEN DISPLAY

(71) Applicants:Michael J Bassier, Macomb Township, MI (US); Neil J Young, Jr., Oxford, MI (US); Marilyn Vala, Rochester Hills, MI (US); Elizabeth Mary Beaubien, Lapeer, MI (US)

(72) Inventors: Michael J Bassier, Macomb Township, MI (US); Neil J Young, Jr., Oxford, MI (US); Marilyn Vala, Rochester Hills, MI (US); Elizabeth Mary Beaubien, Lapeer, MI (US)

(73) Assignee: FCA US LLC, Auburn Hills, MI (US)

( * ) Notice: Subject to any disclaimer, the term of this patent is extended or adjusted under 35 U.S.C. 154(b) by 201 days.

(21) Appl. No.: 14/041,417

(22) Filed: Sep. 30, 2013

(65) Prior Publication Data

US 2015/0094910 A1    Apr. 2, 2015

(51) Int. Cl.
| | | |
|---|---|---|
| *G06F 3/041* | (2006.01) | |
| *B60K 35/00* | (2006.01) | |
| *G09G 5/00* | (2006.01) | |
| *B60K 37/06* | (2006.01) | |

(52) U.S. Cl.
CPC ............ *G06F 3/0416* (2013.01); *B60K 35/00* (2013.01); *B60K 37/06* (2013.01); *G06F 3/0412* (2013.01); *G09G 5/00* (2013.01); *B60K 2350/106* (2013.01); *B60K 2350/1028* (2013.01); *B60K 2350/352* (2013.01); *B60K 2350/962* (2013.01); *G09G 2340/0407* (2013.01); *G09G 2340/0464* (2013.01); *G09G 2380/10* (2013.01)

(58) Field of Classification Search
CPC .......... B60K 35/00; G06F 3/0416; G09G 5/00
See application file for complete search history.

(56) References Cited

U.S. PATENT DOCUMENTS

| | | | |
|---|---|---|---|
| 2003/0006892 A1* | 1/2003 | Church | 340/439 |
| 2009/0058845 A1* | 3/2009 | Fukuda et al. | 345/214 |
| 2013/0205026 A1* | 8/2013 | Ricci | G06F 3/0484 |
| | | | 709/225 |

OTHER PUBLICATIONS

Chrysler Outfits LAPD Cruisers with Uconnect Displays Customized for Law Enforcement, Press Release Sep. 28, 2012, http://www.government-fleet.com/channel/gps-telematics/news/story/2012/09/chrysler-out . . . .
Eric Mayne, Uconnect Gives L.A.P.D. Big-Screen Treatment, Press Release Sep. 27, 2012.

\* cited by examiner

*Primary Examiner* — Basil T Jos
(74) *Attorney, Agent, or Firm* — Ralph E. Smith

(57) ABSTRACT

A vehicle information system includes a "portrait" in-dash touchscreen display for simultaneously displaying both vehicle-specific and application-specific information as vertically-stacked "landscape" renderings, or for displaying a selected one of either the vehicle-specific or application information as a single "portrait" rendering. A further region of the touchscreen's active surface, preferably along its upper margin, is reserved as a fixed command bar to facilitate manual "touch" selection of the information to be displayed on the remainder of the touchscreen's active surface, while the system further dynamically responds to vehicle and operational parameters to select the information for display as appropriate, for example, based on vehicle operation conditions.

13 Claims, 4 Drawing Sheets

VEHICLE MULTI-MODE VERTICAL-SPLIT-SCREEN DISPLAY

FIELD OF THE INVENTION

The invention relates to vehicle in-dash displays, particularly those suitable for selectively displaying significant amounts of application-specific information in addition to vehicle-specific information.

BACKGROUND OF THE INVENTION

A known issue with today's police sedans is a shortage of interior room as additional application-specific gear such as expanded communications equipment, computers, radar, light and siren controller, Automated License Plate Recognition, infrared sensors, long guns, less-lethal armament, video cameras, and other systems are added to the vehicle. Aesthetics aside, this additional equipment can negatively impact officer performance as he or she is forced to interact with multiple systems including multiple displays and other interfaces, particularly as in-cabin crowding may cause one system interface to be at least partially obscured by another system. Still further, these systems can affect occupant safety in the event of a collision, simply because they project into the cabin to define additional hard surfaces with which an occupant might may contact, or by impacting vehicle safety systems such as vehicle airbag deployment.

SUMMARY OF THE INVENTION

In accordance with an aspect of the invention, a vehicle information system adapted to be received in a vehicle instrument panel includes a "portrait" touchscreen display having an active surface including a first region characterized by a height greater than a width; and an interface in communication with the touchscreen display, wherein the interface receives vehicle-specific information to be displayed in a first "landscape" rendering characterized by a width greater than a height, and second application-specific information, such as police-specific information, to be displayed in a second rendering that is either "landscape" or "portrait". In a first operating mode, such as a "vehicle mode", the interface selectively displays the first and second renderings in a vertically-stacked relation on the first region of the active surface of the touchscreen display. In a second operating mode, such as a "police mode", the interface selectively displays the second rendering over the entirety of the first region of the active surface of the touchscreen display.

In accordance with an aspect of the invention, the driver or front-seat passenger can operate a switch to command the interface to switch between vehicle and police modes, as well as to select which vehicle-specific or police-specific information and/or function is to be displayed when in the selected operating mode. Further, the interface preferably receives information representative of a vehicle operating condition, such as vehicle speed, vehicle traction, steering wheel angle, selected transmission gear, ambient temperature, or ambient precipitation, and selects one of the "vehicle" and "police" operating modes based on the vehicle operating condition.

In accordance with another aspect of the invention, the interface receives a first signal identifying a need to blacken at least a portion of the touchscreen display, either as a result of a switch operated by the driver or front-seat passenger, or perhaps from a rear-seat occupant sensor, and the interface blackens at least a portion of the touchscreen by not displaying one or both selected renderings.

In accordance with yet another aspect of the invention, the active surface of the touchscreen display includes a second region discrete from the first region, with the second region being located above the first region and forming no more than about twenty percent of the active surface of the touchscreen display, and most preferably perhaps about ten percent of the active surface of the touchscreen display. The second region, which preferably remains static to thereby define a "permanent" command bar irrespective of the first region's selected operating mode, preferably defines "soft" switches for such vehicle and police functions as "Code 3" operation, "screen off", and an operating mode switch.

In accordance with a further aspect of the invention, the interface defaults to a predetermined one of the first and second operating modes upon a vehicle start up.

From the foregoing, it will be appreciated that a vehicle information system in accordance with the invention beneficially provides an enlarged touchscreen display fitted into the instrument panel's "center stack" that provides both driver and passenger a clear and unobstructed view of the display's contents, with an improved human interface that requires interaction with only a single screen to operate both vehicle-specific and police-specific systems, while the display's relative height in the vehicle and selected and/or prioritized information facilitates safe transitions by the driver from viewing the roadway to the display, and back. Other objects, features, and advantages of the present invention will be readily appreciated upon a review of the subsequent description of several exemplary embodiments and the appended claims, taken in conjunction with the accompanying Drawings.

DETAILED DESCRIPTION OF THE PREFERRED EMBODIMENTS

Figure 1:
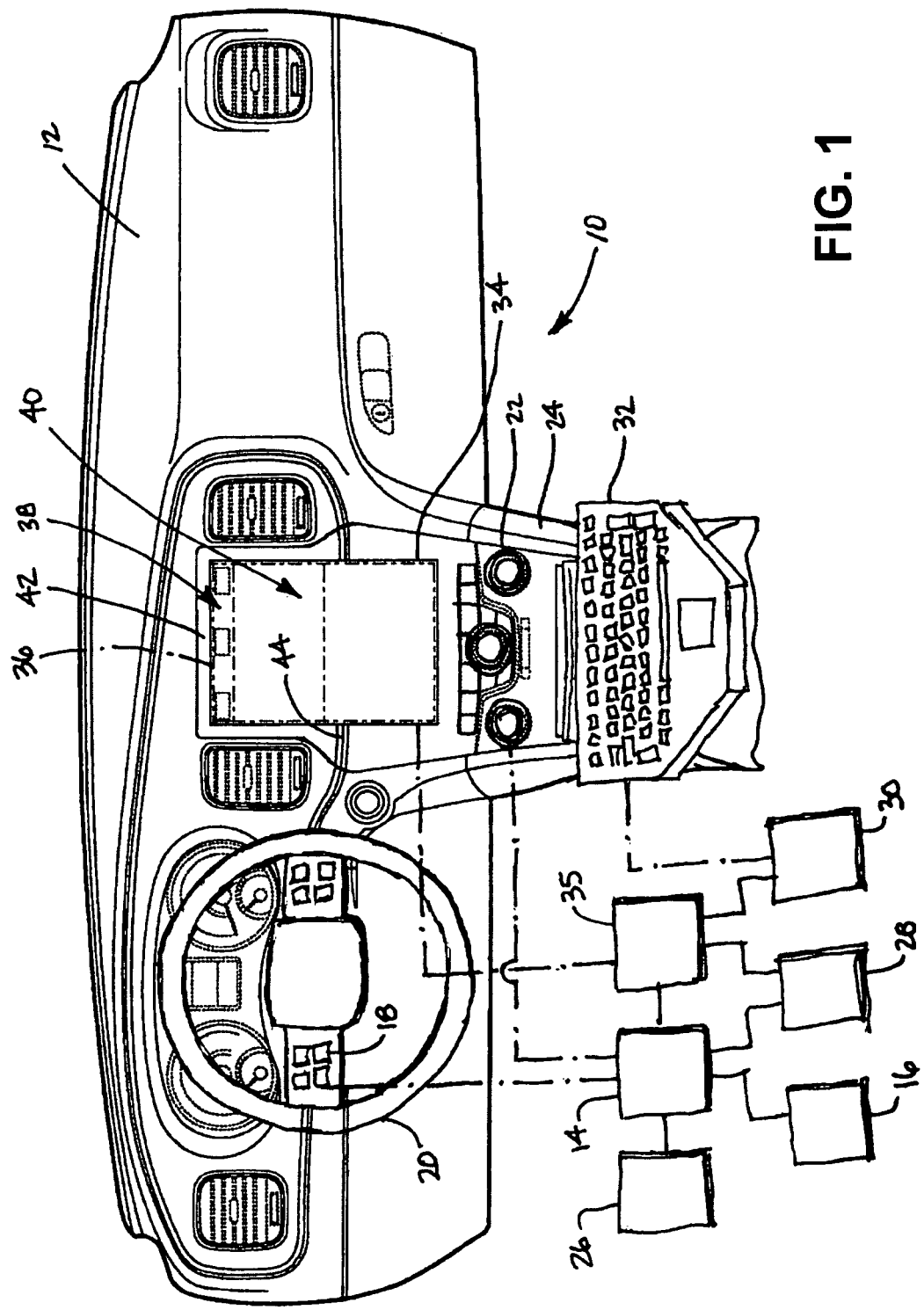
FIG. 1 is partially diagrammatic view of an exemplary vehicle information center in communication with the vehicle's electronic control module (ECM) that itself receives vehicle operating parameters from a plurality of sensors, with the vehicle's telematics module, with a trunk-mounted application-specific laptop computer and removably-mounted keyboard, and with driver-accessible controls on the steering wheel, wherein the information center features a dual-mode vertical-split-screen "portrait" touchscreen display mounted in the vehicle's instrument panel.

Referring to FIG. 1, an exemplary police vehicle information system 10 in the vehicle's instrument panel 12 is shown as being in communication with the vehicle's electronic control module (ECM) 14 that is itself in communication with a plurality of vehicle sensors 16 and other systems including driver-accessible controls 18 on the vehicle's steering wheel 20, "hard" controls 22 disposed on the instrument panel's "center stack" 24, and a rooftop lightbar and siren 26; with the vehicle's telematics module 28; and with a trunk-mounted application-specific police laptop computer 30 and removable console-mounted keyboard 32. The vehicle information system 10 further includes a "portrait" touchscreen display 34 in communication with the ECM 14, the telematics module 28, and the laptop computer 30 via an interface module 35 that multiplexes the inputs to the display between vehicle-related inputs and police-specific information. The touchscreen display 34 is mounted in the vehicle's instrument panel 12 and extends downwardly into at least a portion of the center stack 24, terminating just above the hard controls 22, so as to provide both the vehicle's driver and front-seat passenger with an unobstructed view of the touchscreen display's active surface 36.

Figure 2:
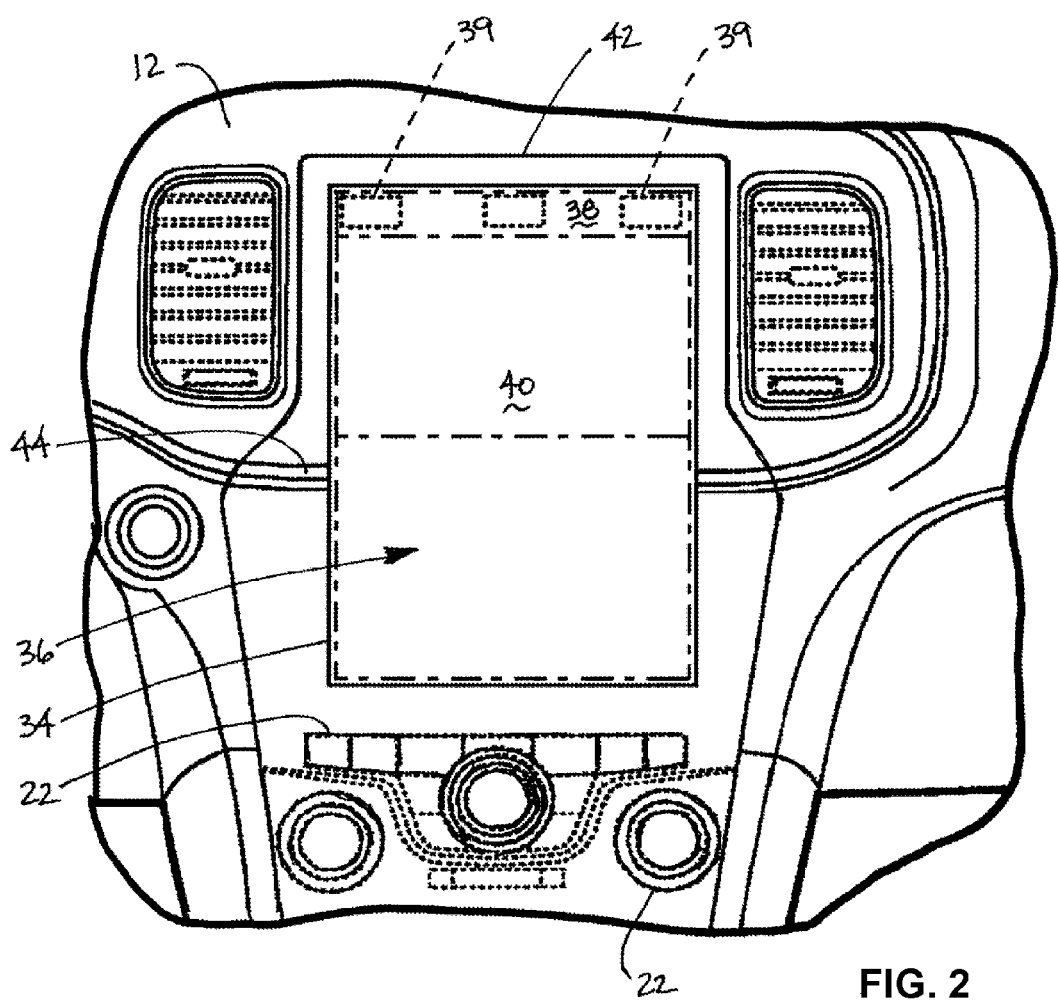
FIG. 2 is an enlarged view of the instrument panel's "center stack" further showing a plurality of "hard" controls disposed below the touchscreen display.
Figure 3:
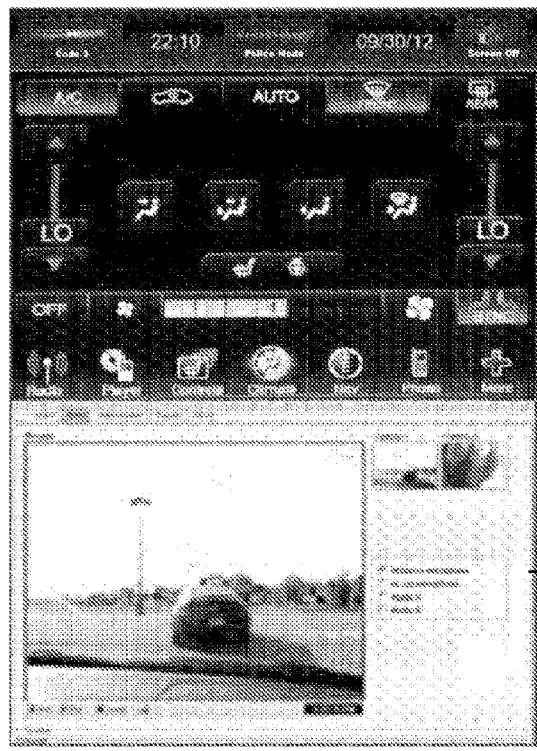
FIG. 3 is a sample view of the touchscreen display's active surface presenting two vertically-stacked "landscape" informational renderings.
Figure 5:
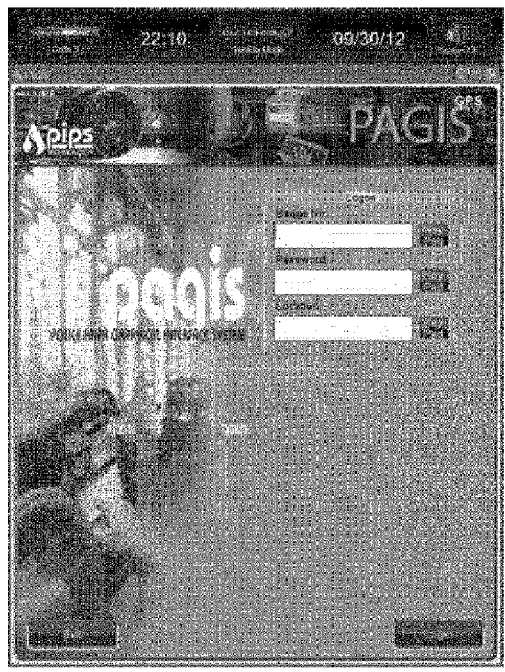
FIGS. 5 and 6 are further samples of the touchscreen display's active surface presenting a rendering of other police-specific information that utilizes the entire lower region of the touchscreen display, with its popup soft keyboard being shown in FIG. 6.

As best seen in FIG. 2, the active surface 36 of the touchscreen display 34 defines an upper region 38 occupying perhaps about ten percent of the active surface 36, along its uppermost extent; and a lower region 40 occupying the balance of the display's active surface 36, below the upper region 38. The upper region 38 thus defines a "command bar" that includes a plurality of "soft" buttons 39 by which to permit either the driver or front-seat passenger to select or otherwise control certain vehicle functions, such as the lightbar and siren during a "Code 3" response, and to otherwise nominally select between display of two "landscape" information renderings, stacked one above the other within the lower region 40 (for example, as shown in FIG. 3), and a single "full-screen", "portrait" rendering within the lower region 40 (for example, as shown in FIG. 5). A "screen off" or "blackout" soft button 39 is also preferably provided in the upper region 38, most preferably in a corner proximate to the display's bezel 42, immediately adjacent to the display's active surface 36, to facilitate its quick selection by a vehicle occupant, for example, to prevent unauthorized persons from viewing any displayed information, or for officer safety during a night-time tactical situation.

An exemplary "vehicle mode" display 102 is illustrated in FIG. 3, wherein the upper portion 104 of the lower region 40, forming perhaps forty-five percent of the touchscreen display's active surface 36, presents vehicle climate information and myriad "soft" controls, many of which facilitate cabin climate control, such as cabin temperature and fan speed, and are otherwise duplicated in the "hard" controls 22 disposed below the display 34. Other vehicle-specific information for display in the upper portion 104 of the touchscreen display's lower region 40 may include, for example, vehicle driver and front-seat passenger customizable profile data, including personalized settings for seating positions, preferred cabin temperature, and other vehicle settings. Similarly, the vehicle information system 10 may be further customized to include a personal setting ("Ignition Start Mode") that allows the driver to choose to have the vehicle always start with either dual-mode "vehicle mode" with its two vertically-stacked renderings, or in "police mode" with its single, enlarged portrait rendering of police-specific information; as well as the nominal content of the police-specific rendering, such as cameras, a login page, reports page, and dispatch.

The lower portion 106 of the lower region 40, forming perhaps the remaining forty-five percent of the touchscreen display's active surface 36, presents selected police-specific information, which in FIG. 3 includes images from two vehicle cameras, with an enlarged image from a further-selected forward-looking camera occupying a substantial portion of the lower region's lower portion 106. FIG. 3 also shows the upper region 38 as advantageously providing additional information for vehicle occupants, such as local time and date. It will be appreciated that other information such as ambient temperature may likewise be "constantly" displayed in the "fixed" or "unchanging" upper region 38 of the touchscreen's active surface 36.

Figure 4:
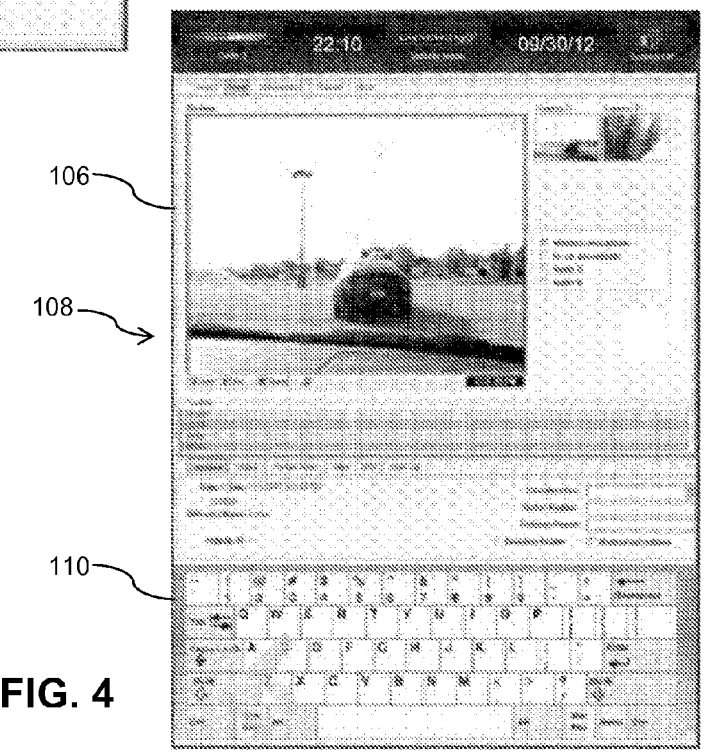
FIG. 4 is a further sample of the touchscreen display's active surface presenting a rendering of police-specific information that utilizes the entire lower region of the touchscreen display, with its popup soft keyboard.

When either the driver or front-seat passenger indicates a desire to enter additional information in connection with the image displayed in the lower portion 106 of the display 102, as by touching a defined portion of the lower portion 106 of the display's lower region 40, or perhaps by alternatively selecting a dynamically-displayed soft button, the information system 10 will switch to a "police mode" display 108 as shown in FIG. 4, wherein the entire lower region 40 presents selected police-specific information 106, with a soft keyboard 110 being optionally displayed to facilitate data entry as further selected by either the driver or front-seat passenger. A "hard" button 22 located beneath the touchscreen display 34 provides a "back" function for displayed information, while a further "hard" knob 22 allows the driver or front-seat passenger to readily scroll through information forming the police-specific rendering, in either portion- or full-screen display mode. Similarly, driver-accessible controls 18 on the vehicle's steering wheel 20 provide the driver with yet another way to select functions and/or information to be displayed on the touchscreen display 34.

Figure 6:
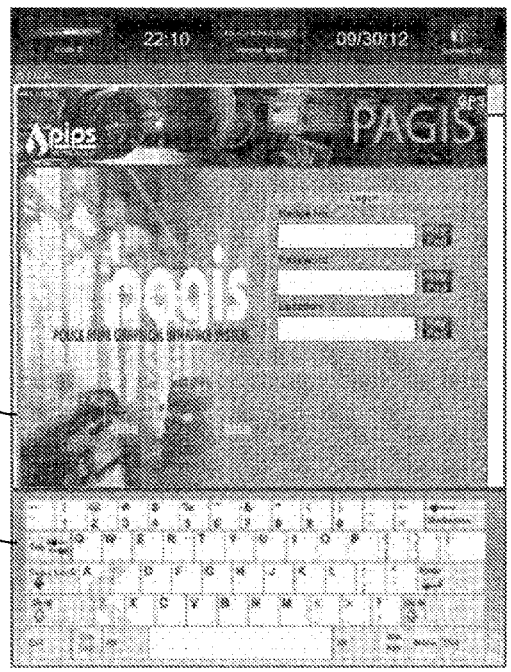

Alternatively, as best seen in FIGS. 5 and 6, the driver or front-seat passenger can operate the "police mode" soft button of the command bar in the upper region 38 of the display's active surface 36, thereby immediately switching the touchscreen display's lower region 40 to provide a selected "full-screen, portrait" rendering 112 of police-specific information 114 on the touchscreen display's lower region 40, such as an automated license plate recognition software interface as shown in FIGS. 5 and 6. As above, either the driver or front-seat passenger can call up a virtual, popup "soft" keyboard 118 along the bottom of the display's active surface 36, for example, by actuating a soft button or with a suitable gesture, such as an upward sweeping motion on the touchscreen display's active surface 36.

In accordance with an aspect of the invention, icons shown on the touchscreen display's active surface 36 while the vehicle is in motion are preferably presented closer to the top of any rendering presented in the upper portion 104 of the lower region 40, or of a rendering utilizing the entire lower region 40, in order to keep eyes "up", closer to viewing the road. Examples of icons to be displayed in the upper portion of any upper rendering include controls for voice communication controls, GPS navigation, Computer-Aided Dispatch, infrared sensor, Automatic License Plate Recognition, and main menu selections. Icons displayed on the touchscreen display's active surface 36 while the vehicle is at rest are conveniently presented closer to the bottom portion of any rendering presented in the lower portion 106 of the touchscreen display 34, or in a full-screen rendering utilizing its entire lower region 40. Examples of police-specific icons to be displayed in the lower portion of any rendering include want and warrant information, report-writing, text communications, Internet, in-car video cameras, electronic subpoena service, and e-mail.

Returning to FIG. 2, to the extent that aesthetic design or other considerations require a "contoured" bezel 42 for the touchscreen display 34, bezel contours 44 preferably define one or more "thumb perches" by which an officer may steady his hand when operating the touchscreen display 34, or to otherwise assist in guiding the officer's finger toward a desired soft button as defined on the touchscreen display. Most preferably, at least one such thumb perch 44 is located adjacent to a point on the touchscreen display 34 on which a given row of icons might be displayed, for example, in the lower landscape rendering of a vertically-split display, further facilitating touchscreen use.

In accordance with another aspect of the invention, the information system 10 may include a "dynamic priority" mode. If this option is selected by either the driver or front-seat passenger, the information displayed in the lower region 40, in either "full screen" or in a vertically-stacked split-screen configuration, will be dynamically selected based on the vehicle's operating environment.

By way of example only, under demanding driving conditions such as nighttime vehicle operation or weather conditions compromising either visibility or vehicle dynamics, the information system 10 will automatically put the rendering corresponding to the higher-priority function of a vertical-split-screen information display in the upper portion 104 of the lower region 40, to facilitate quicker viewing by the driver and, further, to facilitate selection of any displayed information or icon by either the driver or the front-seat passenger. For example, under low ambient light conditions, as detected by ECM 14 based on a signal received from the vehicle's ambient light sensor 16, a display of an image from a forward-looking camera will move to the upper portion 104 of the lower region, for improved viewing.

Other vehicle parameters used to set the priority for the upper portion 104 of the touchscreen display's lower region 40 preferably include vehicle speed, "wipers active", traction control system status, all-wheel drive status, rate of change of steering angle, "Code 3"-active, and external ambient temperature. As yet another example, in a preferred embodiment, an image from a backup camera is preferably automatically displayed in at least the upper portion 104 of the touchscreen display 12 when the vehicle transmission is operated in "reverse." And the screen may preferably switch default to a "screen off"/"blackout" condition, at least as to police-specific information, upon vehicle startup in response to an output of a rear seat sensor indicating that the police sedan's rear seat is occupied.

In accordance with another aspect, the exemplary vehicle information system 10 remains powered for a programmable period of time after the vehicle ignition is turned off, thereby allowing officers to continue to work with the touchscreen interface without having to leave the vehicle in a state where it could be driven.

From the foregoing, it will be appreciated that the invention provides an unobstructed display of both vehicle-specific and application-specific information as vertically-stacked "landscape" renderings on a single "portrait" touchscreen interface, that is switchable either manually or dynamically to a single, enlarged "portrait" rendering of application-specific information, to be used by both driver and front-seat passenger, with improved occupant comfort and safety.

While the above description constitutes an exemplary embodiment, it will be appreciated that the invention is susceptible to modification, variation and change. For example, while the exemplary embodiment defines fixed-content command bar along the touchscreen display's uppermost extent, it will be appreciated that the invention contemplates replacing the "soft" controls of the command bar with suitable "hard" controls, whereby the entirety of the portrait touchscreen can alternatively display either vertically-stacked landscape renderings or a single "full-screen" portrait rendering.

What is claimed is:

1. A vehicle information system adapted to be received in a vehicle instrument panel comprising:
   a touchscreen display having an active surface including a first region characterized by a height greater than a width,
   a rear seat sensor that generates a first signal in response to the presence of a rear-seat vehicle occupant, and
   an interface in communication with the touchscreen display and the rear seat sensor, wherein the interface receives vehicle-specific information to be displayed in a first rendering characterized by a width greater than a height, and second application-specific information to be displayed in a second rendering,
   wherein in a first operating mode, the interface displays the first and second renderings in a vertically-stacked relation on the first region of the active surface of the touchscreen display, and in a second operating mode, the interface displays the second rendering over the entire first region of the active surface of the touchscreen display,
   wherein the interface is adapted to receive the first signal from the rear seat sensor and identify a need to blacken at least a portion of the touchscreen display in response to receiving the first signal, and
   wherein the interface does not display at least one of the first and second renderings in response to identifying the need to blacken at least a portion of the touchscreen display.

2. The vehicle information system of claim 1, wherein the interface receives information representative of a vehicle operating condition, and wherein the interface selects one of the first and second operating modes based on the vehicle operating condition.

3. The vehicle information system of claim 2, wherein the vehicle operating condition is one of the group consisting of vehicle speed, vehicle traction, steering wheel angle.

4. The vehicle information system of claim 2, wherein the vehicle operating condition is one of the group consisting of vehicle speed, vehicle traction, steering wheel angle and selected transmission gear.

5. The vehicle information system of claim 2, wherein the vehicle operating condition is one of the group consisting of ambient temperature and ambient precipitation.

6. The vehicle information system of claim 1, further comprising:
   a first switch adapted to be operated by a vehicle occupant that generates a second signal,
   wherein the interface is in communication with the first switch and is adapted to receive the second signal from the first switch,
   wherein the interface does not display at least one of the first and second renderings in response to receiving the second signal.

7. The vehicle information system of claim 6, wherein the first switch is defined on the active surface of touchscreen display.

8. The vehicle information system of claim 7, wherein the active surface of the touchscreen display includes a second region discrete from the first region, and wherein the first switch is defined in the second region of the touchscreen display.

9. The vehicle information system of claim 1, wherein the active surface of the touchscreen display includes a second region discrete from the first region, the second region being located above the first region, and wherein the second region includes a second switch, the second switch commanding the interface to switch between the first and second operating modes.

10. The vehicle information system of claim 1, wherein the interface defaults to a predetermined one of the first and second operating modes upon a vehicle start up.

11. A vehicle information system adapted to be received in a vehicle instrument panel comprising:
   a touchscreen display having an active surface including a first region characterized by a height greater than a width, and
   an interface in communication with the touchscreen display, the interface being adapted to receive vehicle-specific information and police-specific information,
   wherein the interface is adapted to display the vehicle-specific information in a first rendering characterized by a width greater than a height,
   wherein the interface is adapted to display the police-specific information in a second rendering,
   wherein the interface displays the first and second renderings in a vertically-stacked relationship on the first region of the active surface of the touchscreen display when the interface is in a first operating mode,
   wherein the interface displays the second rendering over the entire first region of the active surface of the touchscreen display when the interface is in a second operating mode.

12. The vehicle information system of claim 11, wherein the police-specific information includes at least one of: dispatch information, police report information, warrant information, and electronic subpoena information.

13. The vehicle information system of claim 11, wherein the vehicle-specific information is generated by a vehicle electronic control module and the police-specific information is not generated by the vehicle electronic control module.

* * * * *